(12) United States Patent
Obayashi et al.

(10) Patent No.: US 7,657,438 B2
(45) Date of Patent: Feb. 2, 2010

(54) METHOD FOR CONTROLLING VEHICULAR ELECTRIC SYSTEM

(75) Inventors: Kazuyoshi Obayashi, Chita-gun (JP); Keisuke Tani, Kariya (JP)

(73) Assignee: Denso Corporation, Kariya (JP)

( * ) Notice: Subject to any disclaimer, the term of this patent is extended or adjusted under 35 U.S.C. 154(b) by 822 days.

(21) Appl. No.: 10/784,273

(22) Filed: Feb. 24, 2004

(65) Prior Publication Data
US 2004/0164616 A1 Aug. 26, 2004

(30) Foreign Application Priority Data
Feb. 25, 2003 (JP) ............................. 2003-047888

(51) Int. Cl.
*G06Q 10/00* (2006.01)
*G06F 17/00* (2006.01)
*H02J 7/14* (2006.01)
*H02J 7/00* (2006.01)

(52) U.S. Cl. ...................... 705/1; 705/400; 903/903; 903/907; 320/104; 320/130

(58) Field of Classification Search .................. 705/1, 705/400; 903/903, 907; 320/104, 130
See application file for complete search history.

(56) References Cited

U.S. PATENT DOCUMENTS

| | | | | |
|---|---|---|---|---|
| 5,349,535 A | * | 9/1994 | Gupta | 702/63 |
| 5,704,440 A | * | 1/1998 | Urban et al. | 180/65.2 |
| 5,820,172 A | * | 10/1998 | Brigham et al. | 290/40 C |
| 5,839,533 A | * | 11/1998 | Mikami et al. | 180/165 |
| 5,927,416 A | | 7/1999 | Del Re et al. | |
| 6,201,312 B1 | * | 3/2001 | Shioiri et al. | 290/40 C |
| 6,209,672 B1 | * | 4/2001 | Severinsky | 180/65.2 |
| 6,335,610 B1 | * | 1/2002 | Winstead | 320/132 |
| 6,430,482 B1 | | 8/2002 | Wakashiro et al. | |
| 6,554,088 B2 | * | 4/2003 | Severinsky et al. | 180/65.2 |
| 6,971,461 B2 | | 12/2005 | Yamamoto et al. | |
| 2002/0058564 A1 | | 5/2002 | Yamamoto et al. | |
| 2003/0015874 A1 | | 1/2003 | Abe et al. | |
| 2003/0072984 A1 | * | 4/2003 | Saloka et al. | 429/26 |
| 2004/0074682 A1 | * | 4/2004 | Fussey et al. | 180/65.2 |

FOREIGN PATENT DOCUMENTS

| | | |
|---|---|---|
| DE | 100 47 932 A1 | 6/2001 |
| EP | 0 830 968 A1 | 3/1998 |
| JP | A-2000-253507 | 9/2000 |
| JP | A-2002-144887 | 5/2002 |

OTHER PUBLICATIONS

Alt, J.T., Anderon, M.D., Jungst, R. G.; "Assessment of Utility Side Cost Savings From Battery Energy Storage"; Jul. 13, 1995; found on URL http://www.osti.gov/bridge/servlets/purl/125166-HdlEsl/webviewable/125166.pdf.*

* cited by examiner

*Primary Examiner*—John W Hayes
*Assistant Examiner*—David J Clark
(74) *Attorney, Agent, or Firm*—Oliff & Berridge, PLC

(57) ABSTRACT

A method for controlling a vehicular electric system having multiple power sources including an engine-driven generator. The power sources for supplying power to charge an onboard battery are determined based on difference between the power generation cost of each power source and that for generating an amount of power charged in the battery. Furthermore, amounts power to be supplied to the battery 103 for charge is determined based on the amount of power currently charged in the battery.

17 Claims, 8 Drawing Sheets

METHOD FOR CONTROLLING VEHICULAR ELECTRIC SYSTEM

CROSS REFERENCE TO RELATED APPLICATION

This application is based on and incorporates herein by reference Japanese Patent Application No. 2003-47888 filed on Feb. 25, 2003.

FIELD OF THE INVENTION

The present invention relates to a method for controlling a vehicular electric system having multiple power sources including an engine-driven generator.

BACKGROUND OF THE INVENTION

In hybrid vehicles, regenerative braking is commonly used for charging a battery, namely, the battery is charged by the regenerative braking or by an engine. Fuel is consumed when the battery is charged by the engine while fuel is not consumed when the battery is charged by the regenerative braking. Therefore, power generation costs for charging the battery varies according to power sources. The power generation costs mean running costs for generating power. In the case that the power generation is performed by the engine, the power generation costs are determined by increases in fuel consumption for increasing engine power for the power generation or costs for the purchase of the fuel.

The fuel economy of the engine varies according to operating conditions of the vehicle in the case that the battery is charged with power generated by the engine. Namely, the power generation cost for charging the battery varies from time to time. Since the power generation costs vary depending on the power sources, the costs of power generation for supplying power to electrical loads in the vehicle vary at different times.

A method and apparatus for determining the cost of battery energy for a hybrid vehicle, which uses the battery energy at high rates, is proposed in U.S. Pat. No. 6,335,610B1 (JP-A-2002-118905). In this method, the cost of supplying charge energy to the battery is periodically computed. If the computation is performed in a long cycle, information regarding the previous battery charge greatly affects the computation. As a result, cost information is not properly updated in a timely manner after power generating conditions have changed. Moreover, a large size of memory is required for the computation.

If the computation is performed in a short cycle, the current cost information greatly affects the computation. As a result, the amount of energy previously charged in the battery is not reflected in the cost information. Furthermore, a usage of information on the computed battery energy cost is not proposed in U.S. Pat. No. 6,335,610B1.

The power generation cost for charging the battery can be reduced by economically managing the power generation. Effective power generation management however has not been provided in terms of fuel economy.

SUMMARY OF THE INVENTION

The present invention therefore has an objective to provide a method for controlling a vehicular electric system for improving fuel economy by managing power generation costs of the electric system effectively utilizing an accurately calculated onboard battery energy cost. A method for controlling a vehicular electric system of the present invention is provided for controlling a vehicular electric system that supplies power from multiple power sources to onboard electrical loads and a battery.

The method includes obtaining information on power generation costs of the power sources, and adjusting distribution of power supply among the power sources or power receiving rates of the loads and the battery based on the information. Each power generation cost may be determined by calculating a cost of generating unit power for each power source. The adjustment of the distribution of power supply or the power receiving rates is performed in such a manner that the power generation cost is reduced.

Priorities are assigned to the power sources based on the power generation costs of the power source so that the power sources that generates power at lower costs supply larger amounts of power. Thus, an overall power generation cost of the electric system can be reduced, and the fuel economy of the vehicle is improved.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENT

Figure 1:
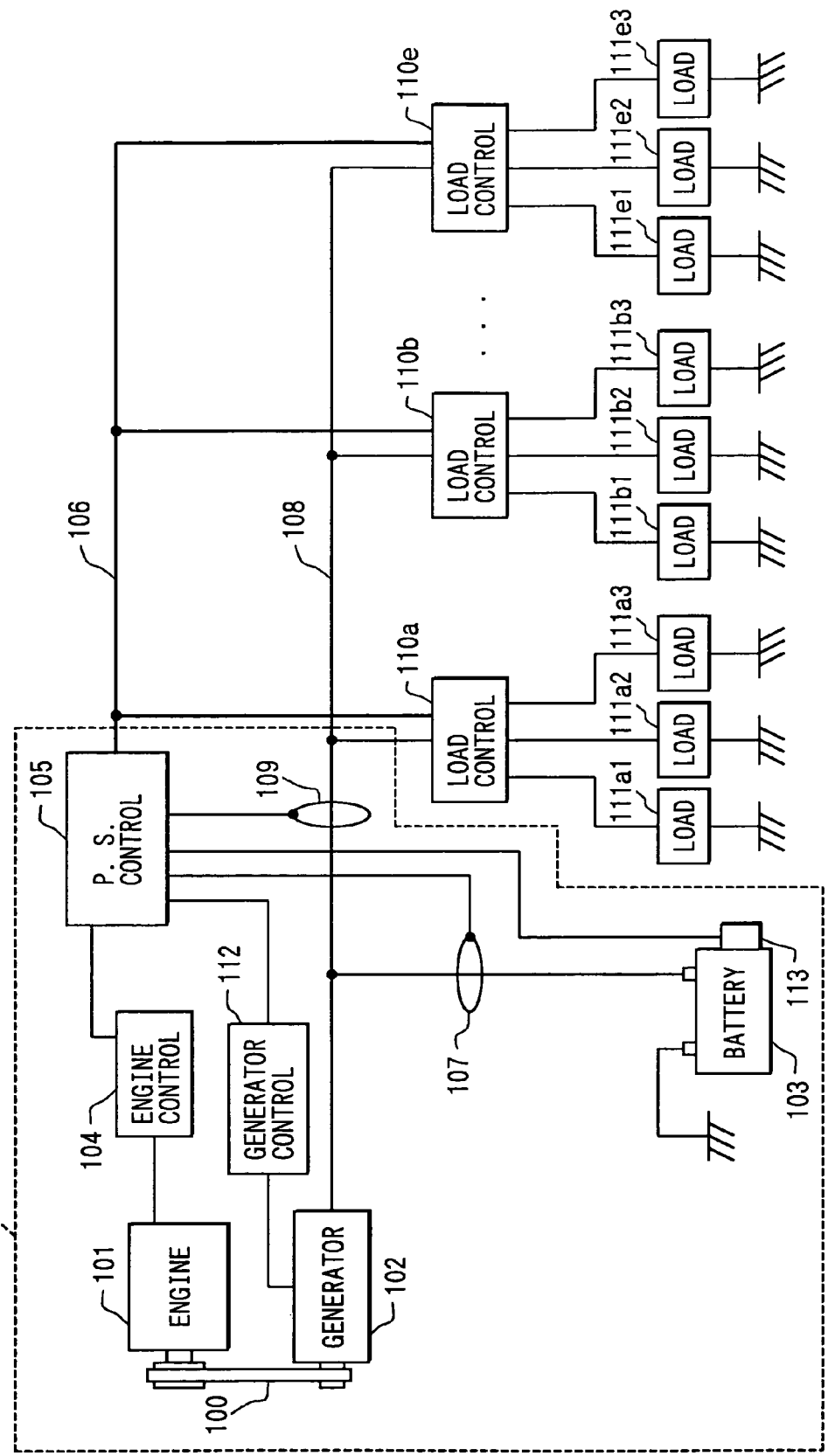
FIG. 1 is a block diagram showing a vehicular electric system according to the first embodiment of the present invention.

The preferred embodiments of the present invention will be explained with reference to the accompanying drawings. In the drawings, the same numerals are used for the same components and devices.

First Embodiment

A vehicular electric system control method is used for controlling a power supply system of a hybrid vehicle. An electric system 1 including the power supply system is shown in FIG. 1. An engine 101 is connected with a generator 102 via a belt 100. The generator 102 is connected with a battery 103 and load control devices 110a-110e via power supply (PS) lines 108. The load control devices 110a, 110b and 110e control power supply to loads 111a1-111a3, 111b1-111b3, 111e1-111e3, respectively. The load control devices 110a, 110b and 10e include operation switches (not shown) and various sensors (not shown) for the control. They control outputs of the loads 111a1-111a3, 111b1-111b3, 111e1-111e3 based on signals inputted from external devices or outputs of the sensors. They adjust the outputs or start and stop the output for the control.

An engine control device 104 for controlling the engine 101 is connected with a power supply (PS) control device 105. It sends various kinds of information on engine conditions including an engine speed detected by sensors (not shown) to the PS control device 105. The engine control device 104 also increases or decreases outputs of the engine 101 based on instruction signals from the PS control device 105.

The PS control device 105 monitors conditions of the generator 102, the battery 103, and the PS lines 108, and controls the generator 102 via a generator control device 112. The PS control device 105 is connected with the generator control device 112, and the power generation of the power generator 102 is controlled based on the instruction signals from the PS control device 105.

The generator control device 112 sends information on generators, including the current generated output and a rotation speed of the generator 102, to the PS control device 105. A battery current sensor 107, a load current sensor 109, a battery temperature sensor 113, and a battery voltage sensor (not shown) are connected with the PS control device 105. The PS control device 105 receives information on input and output currents of the battery, a load current, a battery temperature, and a battery voltage. The PS control device 105 is connected with the load control devices 110a and 10b via multiplex signal transmission lines 106. The information is bidirectionally transmitted between the PS control device 105 and the load control devices 110a and 110b via multiples communication.

The generator control device 112 receives vehicle braking information from a vehicle controller (not shown). It controls the power generation of the generator 102 based on the value that indicates the amount of braking determined based on the braking information. The generator control device 112 generates a vehicle braking force required for this control by increasing the amount of field current in the generator 102 for providing a regenerative braking force.

The vehicle controller calculates the amount of braking force corresponding to the amount of operation of a braking device detected by a brake pedal sensor (not shown). It subtracts the amount of the regenerative braking force from the amount of the vehicle braking force, and sends an instruction signal to a hydraulic brake system for producing the calculated braking force. The generator control device 112 determines an increase in power generation produced by the regenerative braking within a rage of the maximum power generation capacity of the generator 102. Then, it sets the increase within a rage of the maximum charging capacity of the battery, which corresponds to the amount of power required for fully charging the battery. Namely, the generator control device 112 controls the power generation of the generator 102, charge and discharge of the battery 103, and the power consumption of each load 111a1-111a3, 111b1-111b3, 111e1-111e3.

Power control of the electric system 1 performed by the PS control device 105 will be discussed referring to FIG. 2. The power control includes a power generation control and a power consumption control. The power generation control includes steps for detecting power sources that are actually supplying power and determining the amount of generating power for each power source. The generating power and the amount of generating power are also referred to as supplying power and a quota for power distribution of each power source, respectively. The control further includes a step for outputting instruction signals indicating the determined amounts of power to the respective power sources.

The power sources include the engine 101, the regenerative braking system, the battery 103, and other electric systems. The regenerative braking system also functions as a destination of power supply. A combination of the generator 102 and the generator control device 112 functions as a regenerative braking system during the regenerative braking. The cost of generating unit power is hereinafter referred to as a power generation cost or a power cost.

The engine 101 supplies power to the PS lines 108 via the generator 102 when it functions as a power source. The power generation cost of the engine, which is a cost of generating electric power by a power output of the engine, is calculated by the following formula:

a unit fuel price×the current power generation efficiency of the engine (fuel consumption per unit power)×generator efficiency The engine efficiency varies as an engine operating point moves due to the power generation. Although the power generation cost of the engine increases when the engine operates at low efficiency, the engine efficiency improves with the power generation. When the engine operates at high efficiency, the engine efficiency does not improve with the power generation. However, the engine efficiency itself is good. Thus, an amount of fuel consumption at each engine operating point is used for calculating the power generation cost.

For example, if the engine efficiency is 300 g/kWh at an engine operating point $\alpha$ and that is 280 g/kWh at an engine operation point $\beta$, the power of engine used for the power generation is 1500 rpm×2π/60×20 Nn=3.1 kW. An increase in fuel consumption is 0.28×(1500 rpm×2π/60×70 Nn−0.300× (1500 rpm×2π/60×50 Nn)=722 g/h. As a result, the fuel consumption per 1 kw of the power of the engine is 233 g/kWh. If the power generation efficiency is 0.8, the power generation cost is converted to 291 g/kWh.

The power generation cost of the engine 101 is accurately calculated with consideration of the generator efficiency. As a result, an engine operating point at which the power generation cost is low is precisely determined. By generating power by the engine 101 mainly at the point, the power generation cost can be reduced. The engine power generation cost is calculated by converting an increase in fuel consumption for operating the engine 101 due to the power generation. With this method, an effect that the fuel consumption per unit power of the engine 101 is decreased is converted into the power generation cost. The engine 101 is effectively used for the power generation by selecting the power sources based on the converted cost.

The regenerative braking system that functions as a power source is connected with the PS lines 108 via the generator 102 that is a part of the system. The cost of regenerating power (regenerative power cost) by the regenerative braking system is calculated 0 in this embodiment for the purpose of the simplification. Namely, battery drains or other factors are ignored.

Figure 9:
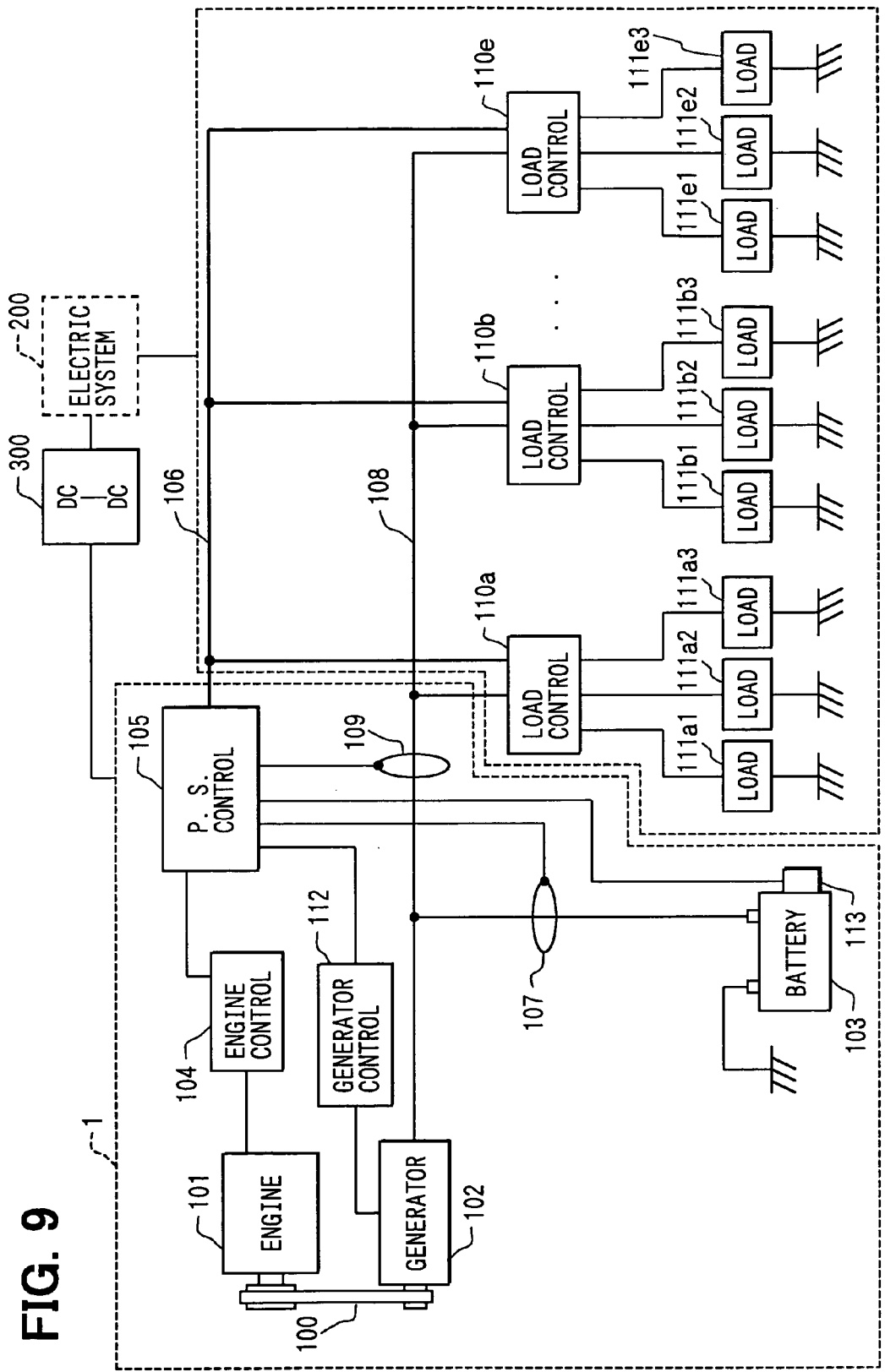
FIG. 9 is a block diagram showing a vehicular electric system with another electric system and a DC-to-DC converter.

Electric systems other than the electric system 1, such as a commercial power supply system used for charging an electric vehicle while it is parked, may be provided. An electric system 200 shown in FIG. 9 and the electric system 1 produce outputs having different levels of voltages. If the electric system 1 is unable to supply a required amount of power, the voltage level of the electric system 200 is adjusted to the voltage level of the electric system 1 via a DC-to-DC converter 300. Then, power is supplied from the electric system 200 to the electric system 1. Likewise, power is supplied from the electric system 1 to the electric system 200 if the electric system 200 is unable to supply a required amount of power. Because the electric systems 1, 200 can interchangeably function as power sources, flexibility in determining quotas for power distribution of power sources can be improved.

In a hybrid vehicle, for example, a high voltage battery and a low voltage battery are normally provided. When power is not sufficiently supplied from the electric system connected with the high voltage battery, the power is supplied from an electric system connected with the low voltage battery through a DC-DC converter. The energy costs of the other power sources are calculated by multiplying the cost of charging the low voltage battery by the charge and discharge efficiency or the DC-DC converter efficiency.

The battery 103 is charged by the engine 101 via the generator 102, by the regenerative braking system, or by an external power source via the PS lines 108. Thus, the power generating cost of the battery 103, which is the cost of generating power supplied by the battery 103, temporally depends on proportions of the engine energy cost, the energy purchase cost, and the regenerative energy cost. Namely, the cost of charging the battery 103 varies according to charge and discharge histories of the battery 103. In order to reflect the cost of generating the charged energy, the power generation cost of the battery 103 is defined by an average of fluctuations in cost of charging the battery 103. The average of fluctuations is referred to as a power cost of fluctuation average or an average power cost.

The power consumption control includes steps of detecting destinations of power supply that actually require power supply, and determining the amounts of power for supply. The destinations of power supply are devices that consume or store generated power, and the amounts of power are determined as quotas for power distribution. The power consumption control further includes a step of sending an instruction signals indicating the determined amounts to the respective destinations.

The destinations include the loads 111a1-111e3 that consume the energy and the battery 103 that stores the energy. The destinations may further include a low voltage battery (not shown). The battery 103 becomes a destination during the charge and a power source during the discharge; however, it cannot be both at the same time. In this power control, the amount of power supplied to the electric system is normally equal to that consumed by the system if errors and losses are not considered.

The PS control device 105 performs power generation control based on the total requested amount of power and the total power generation capacity. The total requested amount of power is a sum of an amount of power requested for charging the battery 103 and an amount of power requested for each load 111a-111e3. The total power generation capacity is the current power generation capacity of the electric system 1. When the total power generation capacity is equal to or higher than the total requested amount of power, the total requested amount of power is generated. When the total power generation capacity is lower than the total requested amount of power, the amount of power corresponding to the total power generation capacity is generated. Alternatively, the total requested amount of power is reduced to the maximum amount of power that the electrical system can generate.

Instruction signals are outputted from a distribution control section 200 of the power control device 105 to the respective power sources or destinations for the power control. The distribution control section 200 sends the instruction signals for supplying the requested amounts of power from the energy sources to the destinations.

The distribution control section 200 stores information on an amount of power that the electric system 1 can supply and on a power generation cost for generating power for that amount. The power generation cost is also referred to as a power supplying cost. For the power generation by the engine 101, the maximum amount of power at the current engine speed, the cost of generating power for the maximum amount, a recommended amount of power for supply, and the cost of generating the recommended amount of power are stored.

For the power generation by the regenerative braking system, the amount of power to be generated instructed by the regenerative braking system, and the cost of generating the power for that amount (=0) are stored. For the discharged of the battery 103, the amount of power that the battery 103 can discharge and the average power cost determined based on the charge histories of the battery 103. The amount of power that the battery 103 can discharge varies according to temperatures, a remaining charged power, and a level of degradation of the battery 103. For the power supply by other power sources, the amount of power that the power sources can supply and the power cost for generating power for that amount are stored.

Figure 3:
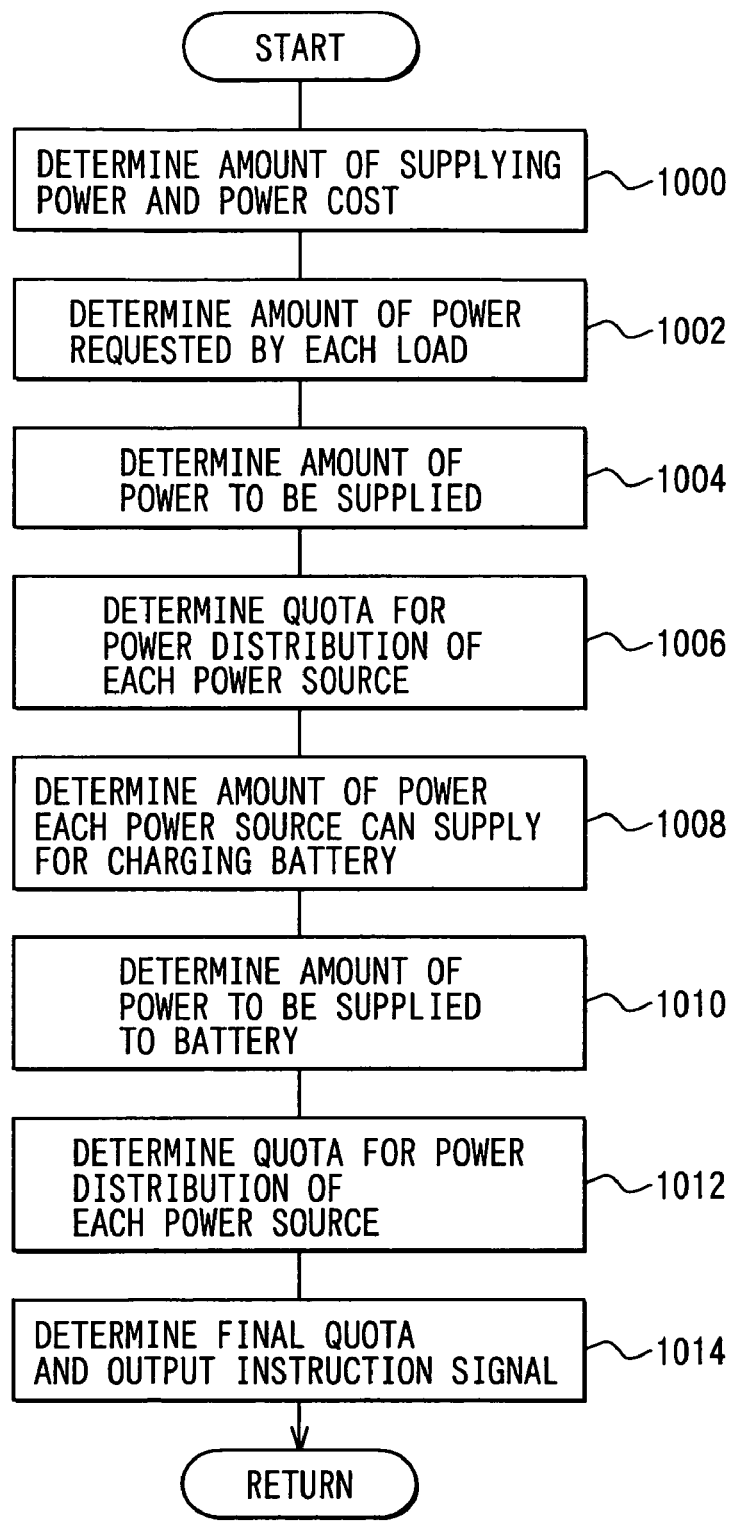
FIG. 3 is a flowchart showing power distribution controls according to the first embodiment.

The power distribution control will be discussed referring to FIG. 3. An amount of supplying power and a power cost of each power source are determined by the above-described methods or predetermined methods (S1000).

An amount of power $P_L$ requested by each load 111a1-111e3 is determined (S1002), and the amount of power $P_{LS}$ to be actually supplied to the load 111a1-111e3 is determined (S1004). The amount of power $P_{LS}$ is set to the requested amount of power $P_L$ if the requested amount of power $P_L$ is smaller than the total amount of power that the electric system 1 can supply. The amount of power $P_{LS}$ is set to the total amount of power that the electric system 1 can supply if the requested amount of power is larger than the amount of power that the electric system 1 can supply.

A quota for power distribution of each power source to the load 111a1-111e3 is determined according to the requested amount $P_L$ (S1006). The overall power cost can be reduced by setting a higher quota for the power source with a lower electric power cost.

The amount of power $P_B$ that each power source can supply for charging the battery 103 is determined (S1008). It is determined based on the amount of power that remains in the power source after the power is distributed to the load 111a1-111e3 by the amount of the quota.

The amount of power $P_{BS}$ to be supplied to the battery 103 for charge is determined (S1010). It is determined based on differences between the pre-calculated power costs of the battery 103 and the power source. If the power cost of the power source is lower than that of the battery 103, the battery 103 is charged by the power source and the power charged in the battery 103 is supplied to the loads 111a1-111e3. Thus, the power cost of the battery 103 is reduced and the overall power cost can be reduced.

Furthermore, operations of the loads 111a1-111e3 are not disturbed by the charge of the battery 103 since only the remaining power of each power source is supplied to the battery 103 after the power is supplied to the loads 111a1-111e3. Still furthermore, the regenerative braking system has a higher priority to supply power to the battery 103 for charge since its power generation cost is substantially zero.

Figure 4:
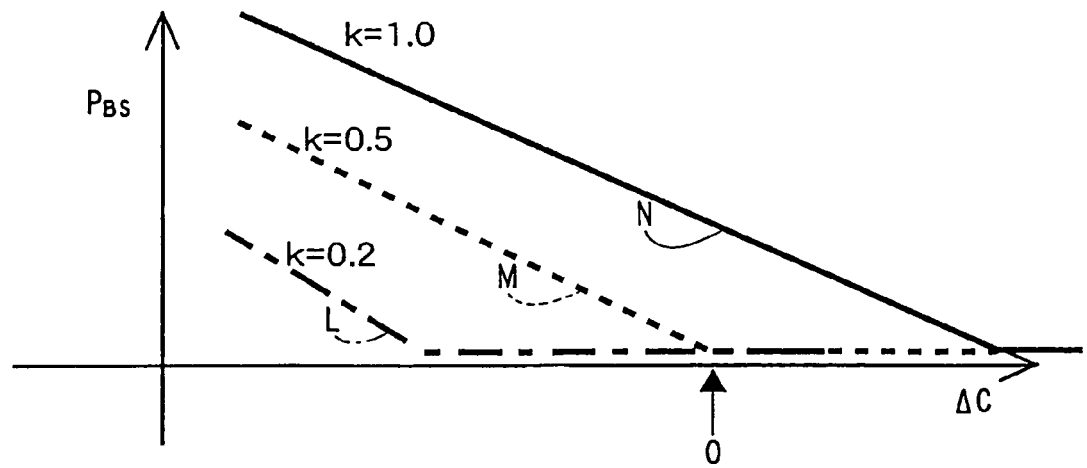
FIG. 4 is characteristic curves showing a relationship between a power generation cost of the battery and that of another power source according to the first embodiment.

Characteristic curves plotted on the difference AC between the power costs of the battery 103 and the other power source versus the amount of power $P_{BS}$ are shown in FIG. 4. The amount of power $P_{BS}$ is also referred to as the amount of charged energy or the requested amount of power for charging the battery 103. The relationship between the difference AC and the amount of power $P_{BS}$ is indicated with downward-sloping characteristic curves. A variable k is a charge control variable that varies according to a state of charge (SOC) of the battery 103 and a rate of change in the state of charge. It is used for increasing or decreasing the amount of charge. The variable k is also referred to as an index or an index of charge.

The characteristic curve M obtained when the variable k is equal to 0.5 shows that the battery 103 is in a good state of charge. When the power cost difference is zero, the amount of generated power is zero. The amount of generated power decreases as the power cost difference increases, namely, the power cost of the power source is higher than that of the battery 103. The characteristic curve N obtained when the variable k is equal to 1.0 shows that the battery 103 is in an over discharge state. In this case, the power source charges the battery 103 even though its power cost is a little high. The characteristic curve L obtained when the variable k is equal to 0.2 shows that the battery 103 is in an over charge state. In this case, the power source does not charge the battery 103 until its power cost becomes relatively low.

Figure 5:
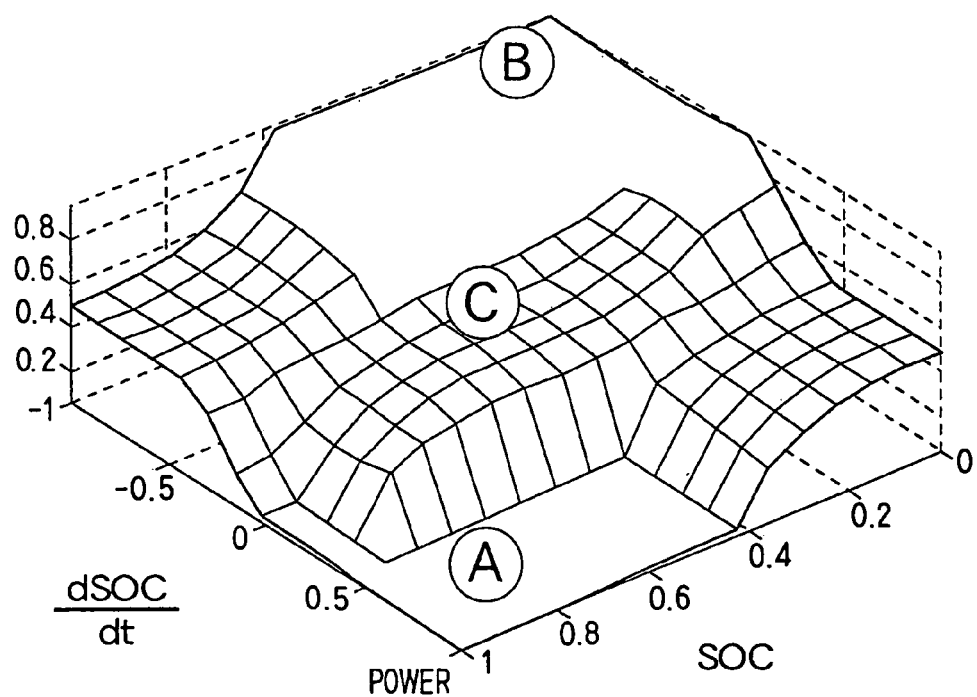
FIG. 5 is a three-dimensional map showing a relationship between a state of charge (SOC) of the battery, a rate of change in the state of charge (dSOC/dt), and an index of charge (K) according to the first embodiment.

FIG. 5 is a three-dimensional map showing relationships between states of charge (SOC) of the battery 103, rates of change (dSOC/dt) in the states of charge, and the variable k. If the rates of change are positive, the battery 103 is in the state of charge. If the rates of change are negative, the battery 103 is in the state of discharge.

The variable k is set to a small value in the area A of the map in which the battery 103 tends to charge although it has been already in the state of over charge. The variable k is set to a large value in the area B in which the battery 103 tends to discharge although it has been already in the state of over discharge. The variable k is set to around a standard value, which is indicated with a broken line in FIG. 4, in the area C.

A quota for power distribution of each power source corresponding to the amount of power $P_{BS}$ for charging the battery 103, which is determined at step S1010, is determined (S1012). The quota is determined based on the power costs, namely, higher quota is set for the power source with the lower power cost.

A final quota for power distribution of each power source is determined based on the quotas determined at step S1006 and S1012, and instruction signals are outputted for performing the power distribution are issued (S1014). When the power generation is performed by the engine 101, the instruction signals are outputted to the generator 102 for generating power and the engine 101 for increasing power by the amount required for the power generation. More specifically, an instruction signal for changing engine torque or a throttle angle is outputted to increase the power of the engine so that the amount of power required for the power generation is assured.

The battery 103 becomes a power source when it is in the state of discharge and a destination when it is in the state of charge. The states of charge and discharge are not directly controlled but indirectly controlled based on the power generation capacity of the other power sources and the amount of power $P_{LS}$ to be supplied to the load. The power cost of the power generation by the engine that is determined when the engine 101 is in a good operating condition is used for the determination. However, the power cost corresponding to the cost for generating the maximum amount of power that the generator 102 can generate if the requested amount of power PL is larger than the total amount of power that the electric system 1 can supply. The generator 102 generates the maximum amount of power by increasing the engine torque.

The power cost is improved by determining the amount of power generation by the engine 101 in a range of good fuel economy. If the power generation is not sufficient for operating the load, the power generation capacity of the generator 102 is increased to the maximum. As a result, the load is supplied with the sufficient amount of power for proper operation. If other power sources are available, power is supplied from the other power sources to the battery 103 when the power costs of the other power sources are lower than that of the battery 103. Furthermore, the battery 103 can supply power to the other power sources.

In the power generation c

Second Embodiment

Figure 6:
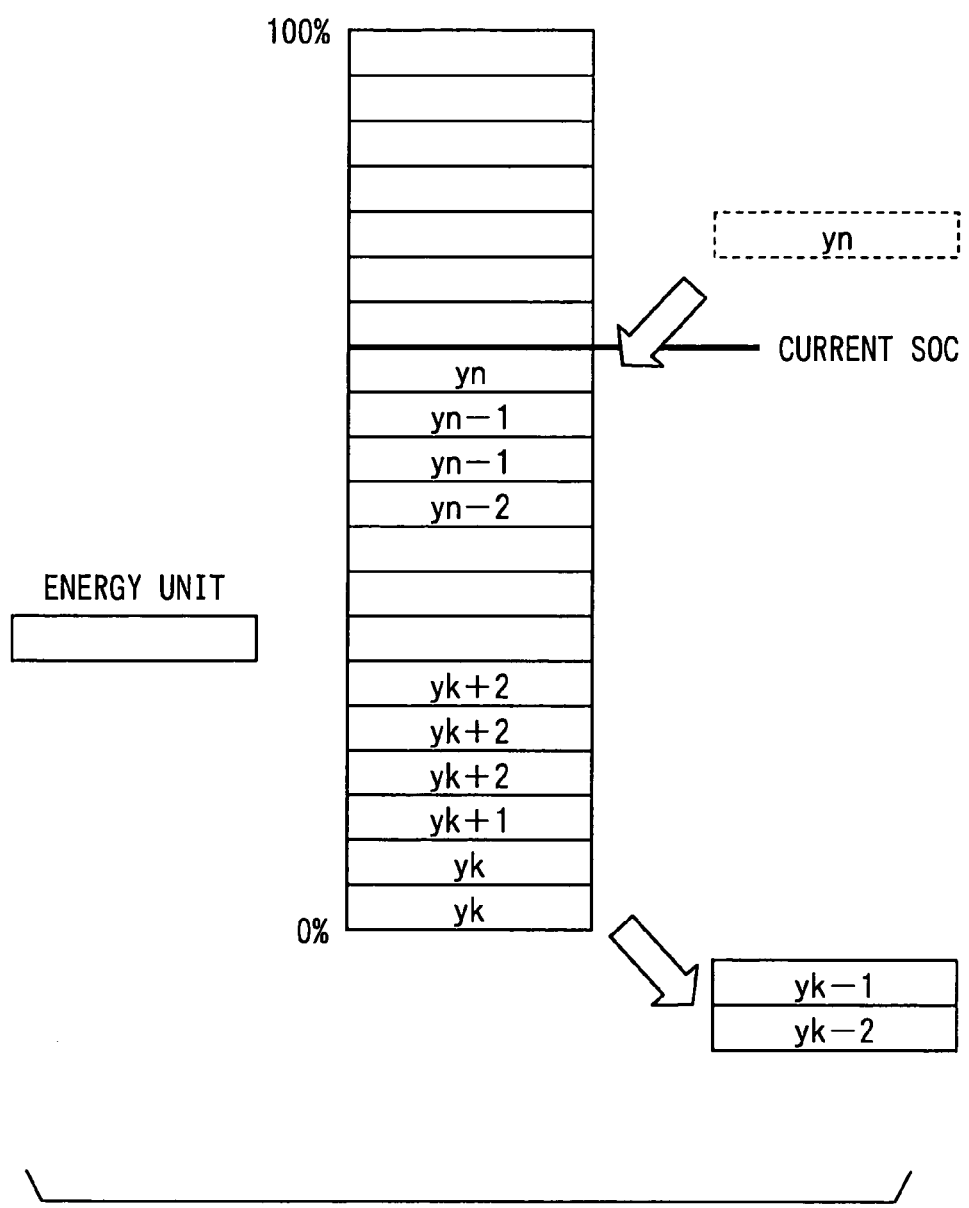
FIG. 6 is an explanatory diagram showing operation of a program for calculating the power generation cost of the battery stored in a power supply control device according to the second embodiment.

A method for calculating the power cost of the battery 103 used for the first embodiment will be discussed referring to FIG. 6. FIG. 6 shows a schematic representation of the state of charge of the battery 103. A large rectangular block indicates the state of charge of the battery 103. The large block is divided into predetermined numbers of identically sized rectangular blocks, each of which indicates a predetermined amount of energy, for example, 10 Wh. Each energy unit is referred to as an energy unit or a stack. The energy unit can be set to indicate 1 Ah if the voltage is assumed to be substantially constant.

Some energy units are continuously added to an energy unit or a pile of the energy units as the charge of the battery 103 progresses, and stacked on top of each other. Some energy units are interruptedly added due to interruptions of the charge or the discharges of the battery 103. The addition of the energy unit stops when the charge of the battery 103 stops. The energy units are removed from the pile as the discharge of the battery 103 progresses on a first-added, first-removed basis. Namely, the energy unit added to the pile first is removed from the pile first, the energy unit added to the pile next is removed from the pile next, and so on. The energy units corresponding to the current state of charge are assumed to be previously stacked in a predetermined period. The power source control device 105 stores a power cost for generating power to charge the battery 103 by the amount of the energy corresponding to the energy unit in chronological order.

In FIG. 6, one energy unit is newly added to the pile of energy units that corresponds to the current state of charge and two energy units are removed after a predetermined period of time. The power cost of the battery 103 used as a power source can be calculated as a unit of power cost for generating a unit power. In this embodiment, it is calculated as a unit cost that is a power cost for generating the amount of power corresponding to one energy unit. The amount of fuel consumed for generating power of the energy unit, charging the battery 103 and discharging the power of the energy unit or the fuel cost for purchasing the amount of the fuel may be used as the unit cost. The unit cost for generating the power of the energy unit by the regenerative braking system is counted zero.

Figure 2:
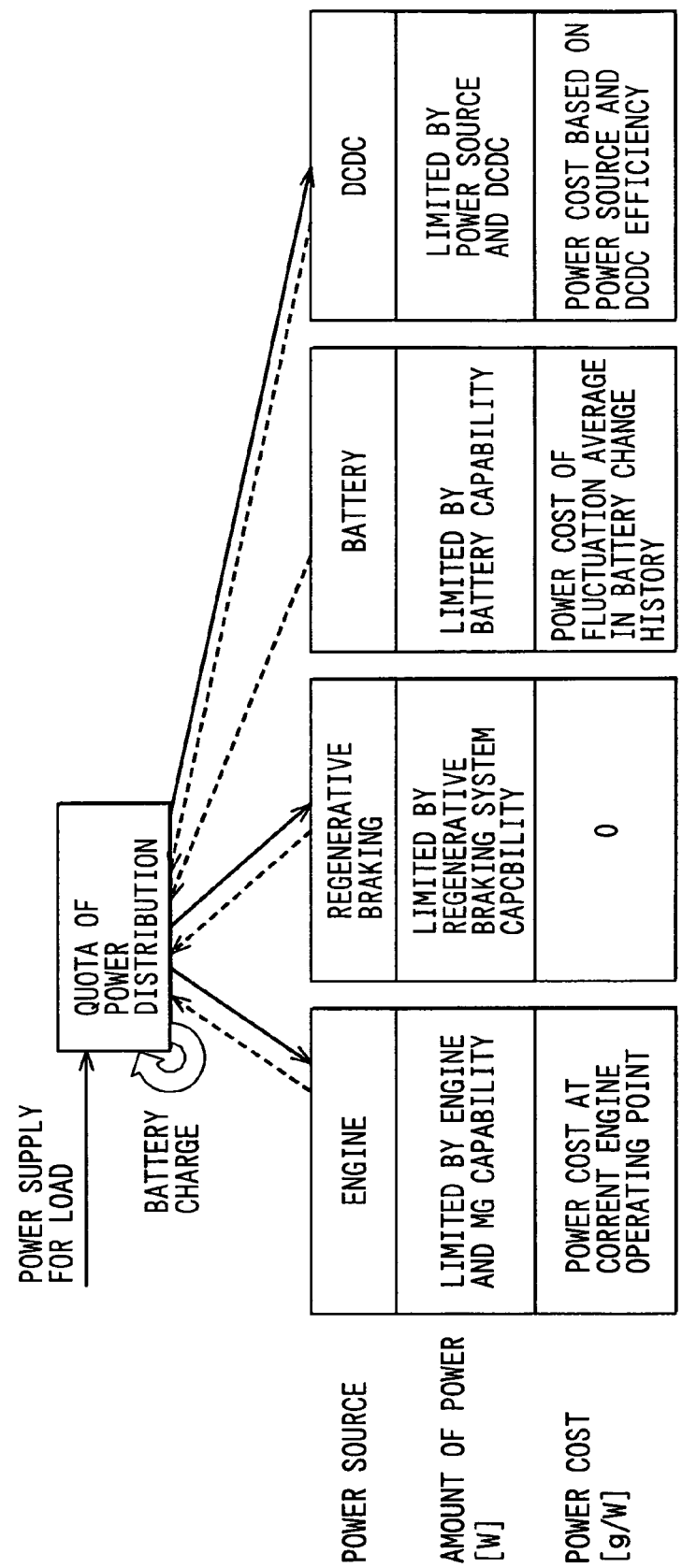
FIG. 2 is an explanatory diagram showing power generation controls for the vehicular electric system according to the first embodiment.

The power source control device 105 stores a table of each energy unit corresponding to the current state of charge and its unit cost, such as one shown in FIG. 2. The power source control device 105 only requires the number of unit data storage areas equals to the number of the energy units, the total amount of power of which corresponds to 100% of the state of charge. Each unit data storage area can be very small in capacity because it only stores a unit number and a power cost.

The current unit cost of the battery 103 is determined by calculating an average of the power costs of the energy units stored in the table. The simplest way is calculating the total of the currently calculated unit costs and dividing the total unit cost by the current number of the energy units. The total of the currently calculated unit costs is calculated by adding unit costs of the energy units stacked during the period between the last calculation and the current calculation, and subtracting the unit costs of energy units discharged during the period between the last calculation and the current calculation. When the current power cost is calculated per the unit amount of power, the energy unit is converted into the unit amount of power.

This method is one of the methods for obtaining the power cost of fluctuation average, and used for updating the power cost of generating power of one energy unit. By using this method for updating the power cost, the calculation can be simplified. Furthermore, the discharge of the battery 103 can be controlled based on a result of relative comparison of the power generation costs between the battery and other power source. The discharge of the battery 103 has a higher priority than the power supply from other power sources when the power generation cost of the battery 103 is relatively low. The overall power generation cost of the electric system 1 can be reduced with this control.

The power generation of the generator 102 is controlled based on the information on the power generation cost for charging the battery 103. Namely, the power generation of the generator 102 is increased when the power generation cost of the generator 102 is relatively low compared to that of the battery 103. The average power generation cost of the electric system 1 can be reduced with this control.

Figure 7:
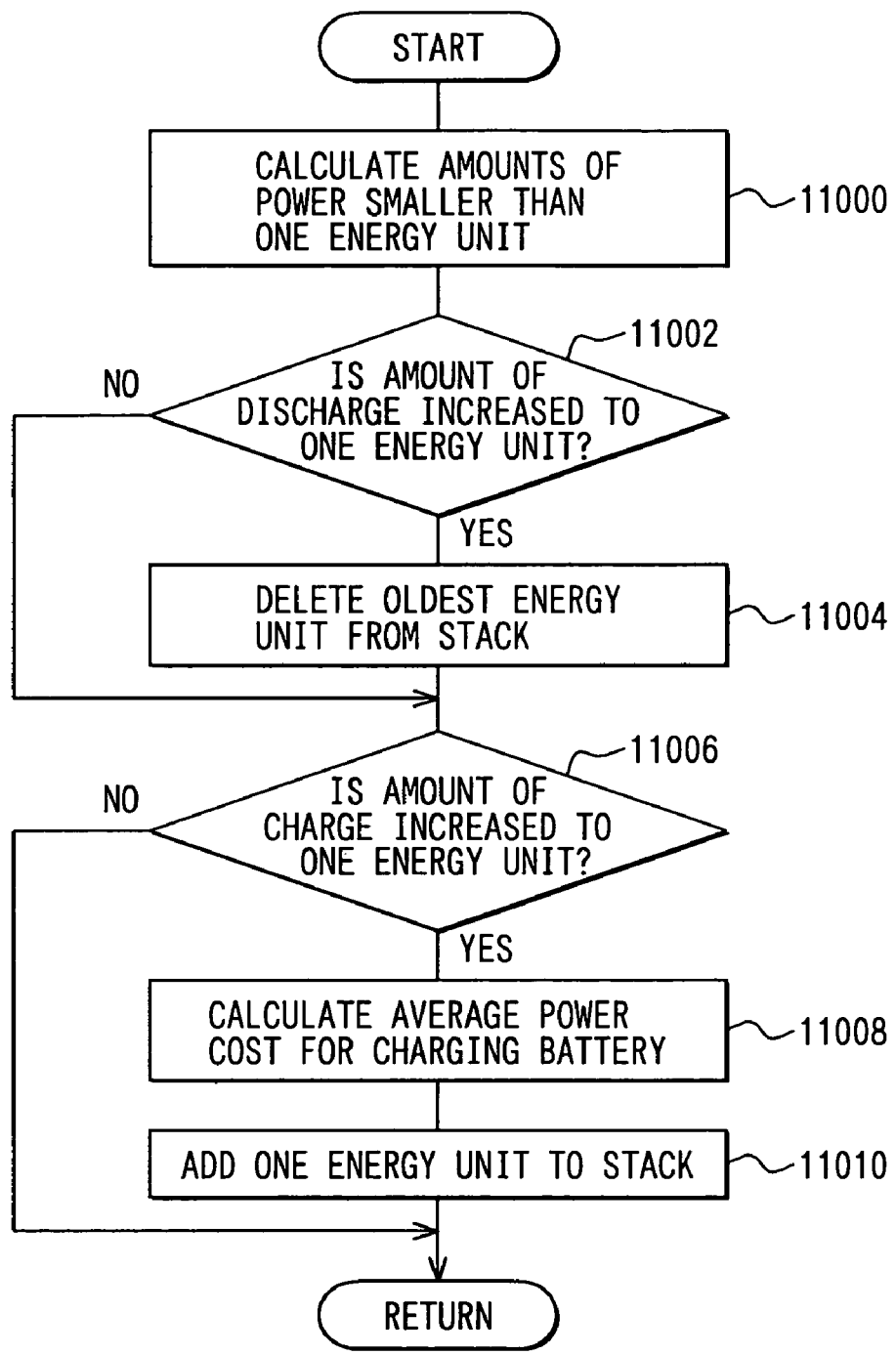
FIG. 7 is a flowchart showing steps for calculating the power generation cost of the battery according to the second embodiment.

The amount of power lost by self-discharge can be determined in the same manner as the amount of power consumed by the load. In the calculation of the power cost of the battery 103, the amount of power smaller than the amount of one energy unit cannot be calculated. As a result, an error is produced. A method for correcting the error will be explained referring to FIG. 7.

The amount of power smaller than the amount of one energy unit is determined by separately calculating the amounts of power of charge and discharge (S11000). It is determined whether the amount of power for charge is increased to the amount of the energy unit (S11002). Namely, it is determined whether a cumulative amount of power of discharge reaches the amount of power corresponding to the energy unit. If it is increased, data on the energy unit that is added to the pile first (oldest energy unit) is deleted from the table (S11004).

It is determined whether the amount of power of charge is increased to the amount of the energy unit (S11006). Namely, it is determined whether a cumulative amount of charge reaches the amount of power corresponding to the energy unit. If it is increased, the power cost of generating power of the energy unit, which is an average power cost for the charge, is calculated (S11008). Data on the most recently added energy unit is stored in the table (S11010).

Figure 8:
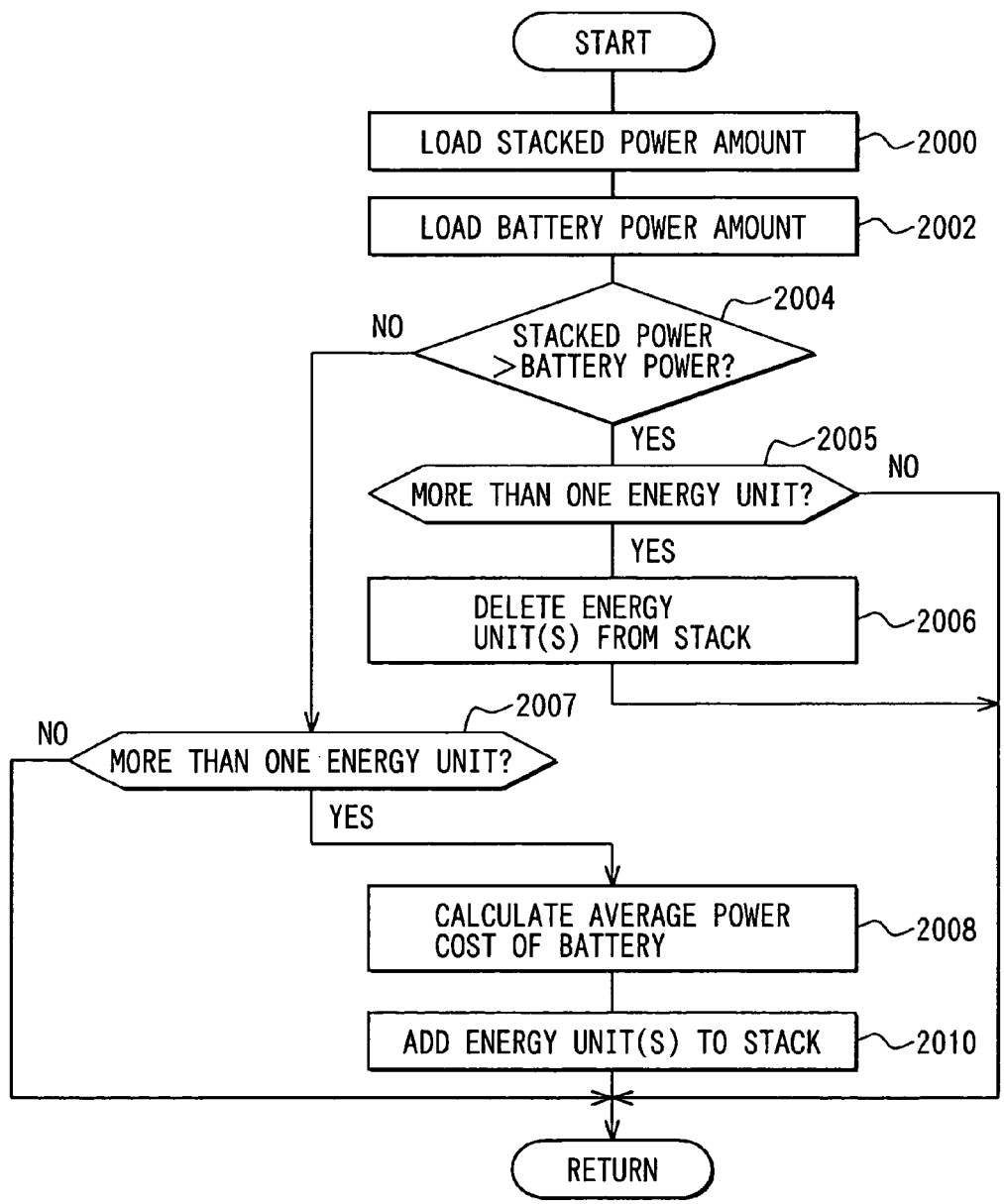
FIG. 8 is a flowchart showing steps for correcting a cumulative error according to the second embodiment.

If the amounts of power for the charge and discharge are calculated by the above method for a long period of time, errors are cumulated. To correct the errors, the steps shown in FIG. 8 are performed.

The currently stored state of charge (SOC), which is referred to as a stacked power amount, is calculated by multiplying the number of energy units stored in the table by the amount of power of the energy unit, and the stacked power amount is loaded (S2000). The current SOC, which is referred to as a battery power amount, is loaded (S2002). The current SOC is continuously calculated by a battery controller (not shown) that controls the battery 103. The control of the battery 103 can be performed by the power supply control device 105.

It is determined whether the stacked power amount, which corresponds to the number of the energy units to be stored, is larger than the battery power amount, which corresponds to the actual number of the energy units calculated from the SOC (S2004). If it is larger, it is determined whether the stacked power amount is larger than the battery power amount by more than the power amount of one energy unit (S2005). If it is not, this routine is terminated. If it is larger, the amounts of power are added from the first stacked energy unit until the total amount of power becomes most closely to the difference between the stacked power amount and the battery power amount. Then, data on the energy units, the total amount of which is most close to the difference, is deleted from the table (S2006), and this routine is completed.

If the stacked power amount is smaller than the battery power amount (NO at step S2004), it is determined whether the stacked power amount is smaller than the battery power amount by more than one energy unit (S2007). If so, the power cost of the most recent energy unit, which is an average power cost, is calculated (S2008). Data on the calculated power cost is stored in the table as data on the most recent energy unit together with information on the power generation cost of the energy unit (S2010). Errors between the calculated SOC and the actually measured SOC are periodically corrected by periodically correcting the number of energy units to match the SOC of the battery 103 that is separately determined before storing in the table.

The present invention should not be limited to the embodiment previously discussed and shown in the figures, but may be implemented in various ways without departing from the spirit of the invention.

What is claimed is:

1. A method for controlling a vehicular electric system having a plurality of power sources that supplies power to an onboard electrical load and an onboard battery, wherein the plurality of power sources includes at least one of a generator driven by an engine of a vehicle, a regenerative braking system, and an external source, the vehicular electric system including a power supply control device that controls power distribution from each of the power supplies, the battery having a storage capacity of a plurality of hypothetical energy units, the method comprising:

storing, by the power supply control device, a cost of generation for each unit of charge stored in the battery;

obtaining, by the power supply control device, information that includes, for each power source, a power generation cost that is an amount corresponding to fuel consumption for generating unit electrical power by the power source, the information further including information on an energy cost of the onboard battery based on charge and discharge histories of the onboard battery, the charge and discharge histories of the onboard battery including, for each unit of charge stored in the battery, the generation cost of the unit of charge;

determining a current cost of the battery from the costs of generation corresponding to the units of charge stored in the battery;

determining an amount of power that needs to be supplied;

calculating, by the power supply control device, a quota for power distribution for each of the power sources and the batten from the power generation costs of the power sources and the current cost of the battery; and adjusting a power supply distribution of the plurality of power sources, a receiving power rate of the onboard electrical load, and one of a power supply distribution of the onboard battery and a receiving power rate of the onboard battery to reduce a consumed power cost, wherein the adjusting is based on the information and performed by prioritizing a power supply from one of the plurality of power sources which has a lowest power generation cost of the plurality of power sources.

2. The method for controlling the vehicular electric system according to claim 1, wherein the adjusting power supply distribution is performed based on the power generation cost of each power source and available power supply from each power source.

3. The method for controlling the vehicular electric system according to claim 1, further comprising:

controlling a power generation of each power source based on the power supply distribution; and outputting an instruction signal to a device that supplies power to the plurality of power sources for controlling an output of the device based on the power supply distribution.

4. The method for controlling the vehicular electric system according to claim 1, further comprising:

determining the power supply distribution of the plurality of power sources to the onboard battery based on the information.

5. The method for controlling the vehicular electric system according to claim 4, wherein the power supply from the one of the plurality of power sources which has the lowest power generation cost of the plurality of power sources, is prioritized when the onboard battery is charged.

6. The method for controlling the vehicular electric system according to claim 4, wherein the plurality of power sources includes an engine of a hybrid vehicle and a regenerative braking system.

7. The method for controlling the vehicular electric system according to claim 6, wherein the power supply of regenerative electric power supplied by the regenerative braking system is prioritized when the onboard battery is charged.

8. The method for controlling the vehicular electric system according to claim 4, wherein the adjusting the power supply distribution for supplying power to the onboard battery is performed in accordance with a difference between the power generation cost of the onboard battery as one of the power sources and the power generation cost of another power source that supplies power to the onboard battery.

9. The method for controlling the vehicular electric system according to claim 8, wherein the adjusting the power supply distribution for supplying power to the onboard battery is performed based on the difference between the costs and a state of charge of the onboard battery.

10. The method for controlling the vehicular electric system according to claim 9, wherein the state of charge of the onboard battery is determined using an amount of power charged in the onboard battery and a variation in the amount of power.

11. The method for controlling the vehicular electric system according to claim 4, further comprising:

calculating and preferentially distributing a part of power supplied from the power sources to the electrical load; and calculating and distributing the other part of power to the onboard battery, the other part supplied from the power sources after the distribution to the electrical loads.

12. The method for controlling the vehicular electric system according to claim 1, further comprising:

transferring power between the vehicle electric system and another vehicle electric system in such a manner that voltage of the another vehicle electric system is converted to voltage of the vehicle electric system, wherein the voltage of the another vehicle electric system is different from the voltage of the vehicle electric system.

13. The method for controlling the vehicular electric system according to claim 1, further comprising:

obtaining the information concerning a power generation cost of the generator driven by the engine of the vehicle based on engine efficiency at an engine operating point.

14. The method for controlling the vehicular electric system according to claim 13, further comprising:

correcting the power generation cost based on information of generator efficiency.

15. The method for controlling the vehicular electric system according to claim 13, wherein the power generation cost of the generator driven by the engine of the vehicle is determined based on an increase in consumed fuel for driving the engine due to the power generation.

16. The method for controlling the vehicular electric system according to claim 1, wherein the cost is defined by one of fuel weight, fuel volume, $CO_2$ generation amount, fuel price, and their combination.

17. The method for controlling the vehicular electric system according to claim 1, wherein the cost is defined by an equation of (a unit fuel price)×(fuel consumption per unit power)×(generator efficiency).

* * * * *